Feb. 9, 1926. 1,572,143
G. E. HOWARD
MULTIPLE MOLD SHEAR DEVICE FOR GLASS WORKING MACHINES
Filed March 21, 1925
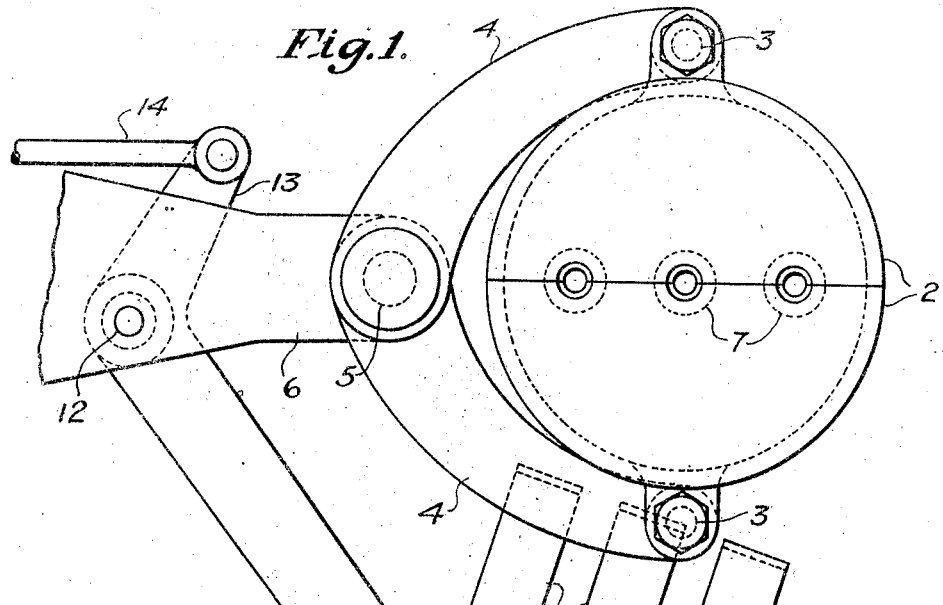
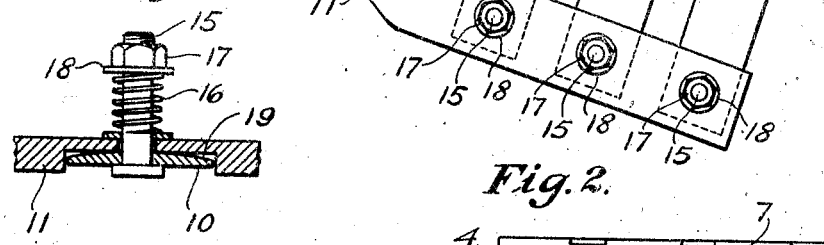
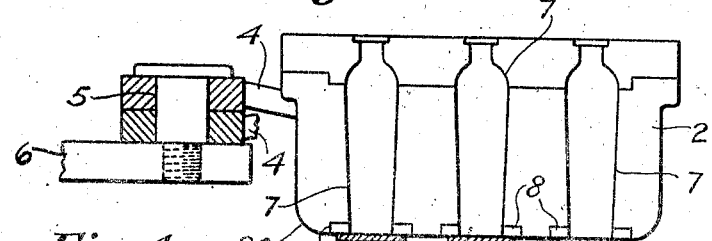
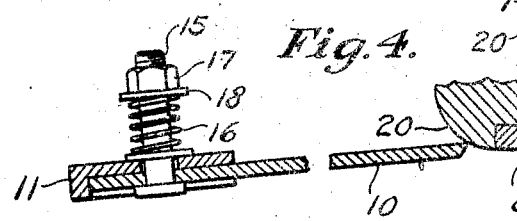
Inventor
George E. Howard
by Robert D. Brown
Attorney.

Patented Feb. 9, 1926.

1,572,143

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

MULTIPLE-MOLD SHEAR DEVICE FOR GLASS-WORKING MACHINES.

Application filed March 21, 1925. Serial No. 17,435.

*To all whom it may concern:*

Be it known that I, GEORGE E. HOWARD, a citizen of the United States, residing at Butler, in the county of Butler and State of Pennsylvania, have invented certain new and useful Improvements in Multiple-Mold Shear Devices for Glass-Working Machines, of which the following is a specification.

My invention relates to glass-working machines which employ multiple molds, that is to say, molds having plural molding cavities which are fed simultaneously with molten glass.

More specifically, my invention relates to glassware forming machines of the Owens suction type, wherein a mold is lowered into contact with the surface of a mass of molten glass, and a mold charge is drawn up into the mold by suction. When the mold is thus filled with molten glass, a shear is moved across the bottom of the mold for the purpose of severing the mold charge from the general body of glass from which the mold charge was taken.

When a mold of this character is provided with two or more molding cavities, the cut-off knife has heretofore been made with one large blade, which sweeps across the lower ends of all of the molding cavities. Since the cut-off bushings with which the blade cooperates are individual to each mold, difficulty has been experienced in maintaining cutting alignment between the single blade and the several cut-off bushings. If the blade is not in proper alignment with any one of the bushings, glass is smeared between the knife and the bushing, and a rough bottom is produced in the finished ware from that mold.

The object of my invention is to improve cut-off devices of the character indicated above, by providing individual blades for each cavity of the mold, and by mounting the blades on a common support, each blade being spring-mounted so as to be self-aligning with the particular mold which it serves. Such spring mounting may be accomplished by making the blade itself of resilient material, or, preferably, by mounting each blade upon the blade support by means of a resilient connection which enables the blade to align itself with the cut-off bushing of its mold cavity, even though the blade itself may be rigid.

In the accompanying drawing:

Figure 1 is a plan view of an Owens-type multiple mold, equipped with a cut-off device constructed in accordance with my invention;

Fig. 2 is a vertical sectional view taken substantially on the line 2—2, Fig. 1, and showing the manner in which the shear blades cooperate individually with the cavities of the molds;

Fig. 3 is an enlarged section taken substantially on the line 3—3, Fig. 1, showing one manner in which the shear blades may be spring mounted on the blade support; and Figs. 4 and 5 are enlarged vertical sectional views showing the manner in which each individual shear blade engages and conforms to the mold surfaces with which it is associated.

In the drawing, the numerals 2 indicate the cooperating halves of a suction-fed parison mold, the mold halves being mounted pivotally at 3 on arms 4 that are pivoted together at 5 upon an arm 6, which may be one of the arms of a suction-fed bottle machine of the Owens type. The mold halves 2 are provided with recesses which cooperate to form a plurality of molding cavities 7, and cut-off bushings 8 are provided at the lower ends of the molding cavities, as is usual in molds of this type. In the present instance, the mold is provided with three cavities.

Shear blades 10, corresponding in number to the mold cavities 7, are mounted upon a common shear support 11, which is pivotally mounted at 12 on the arm 6 or elsewhere on the frame of the machine. The support 11 is rocked on its pivot 12 by means of a lever 13, which is connected by means of a link 14 to the usual shear-operating mechanism of the machine.

Each of the blades 10, as best shown in Figs. 3, 4 and 5, is secured resiliently to the support 11, by means of a vertical bolt 15 which passes through openings in the blade 10 and in the support 11, and is surrounded above the support 11 by a compression spring 16, the tension of which may be adjusted by means of a nut 17, which acts upon the spring 16 through a washer 18. The upper surfaces of the blades 10 may be curved transversely at their rear portions which engage beneath the support 11, as shown at 19 in Fig. 3, in order to enable the blades to rock laterally, if necessary, to conform to the mold and the mold bushings. The portion of the support 11 which carries the blades 10 may be tilted as shown in Figs. 4 and 5, so as to cause the blades 10 to be inclined upwardly as they approach the mold. The pivot 12 upon which the shear support 11 is mounted should be accurately aligned with the axis of the mold.

When the support 11 is rocked to cause the blades 10 to sweep beneath the mold, as shown in Fig. 2, each of the blades 10 first engages the rounded lower edge 20 of the mold. As the blade advances, it is guided by the contour of the mold, the spring 16 yielding to permit the blade to take the position shown in Fig. 5, if the blade support is tilted, as shown, after which the blade continues to sweep across the cut-off bushing and is pressed upwardly against the bushing by the spring 16. In this manner, each of the blades 10 is able to align itself individually with its cut-off bushing. Each blade, therefore, severs the glass properly, even though the cut-off bushings may not be exactly in alignment.

I have shown in the drawing a structure which is well adapted for carrying out my invention, but it will be understood that various other arrangements may be adopted within the scope of the appended claims.

I claim:

1. A multiple-mold shear device for glass-working machines, comprising a blade support and a plurality of shear blades carried by said support, the said blades being adapted individually to sever mold charges of glass adjacent to the molding cavities of a multiple mold.

2. A multiple-mold shear device for glass-working machines, comprising a blade support and a plurality of shear blades carried by the said support, each of the said shear blades being resilient with respect to the said support.

3. A multiple-mold shear device for glass-working machines, comprising a blade support, a plurality of shear blades carried by the said support, and a spring mounting for attaching each of said blades resiliently to said support.

4. A multiple-mold shear device for glass-working machines, comprising a blade support and a plurality of shear blades carried by said support and resilient with respect to said support, the said shear blades being adapted by the said resilient mounting to align themselves individually with the molding cavities of a multiple glass mold in simultaneously shearing mold charges of glass.

5. A multiple-mold shear device for glass-working machines, comprising a blade support and a plurality of blades carried by the said support, each of said blades being secured to the said support by means of a resilient mounting including a fastening member extending through the blade and the said support, and a spring surrounding said fastening member and adapted to hold said blade yieldingly against said support.

6. A multiple-mold shear device for glass-working machines, comprising an oscillable blade support having a transversely inclined blade-supporting portion, and a plurality of blades, each having one end yieldingly secured beneath said support, the said blades being inclined upwardly and having cutting edges on their upper and outer ends.

7. A multiple-mold shear device for glass-working machines, comprising a blade support and a plurality of blades carried by the said support, each of the said blades being secured yieldingly to the lower side of said support by means of a bolt extending through registering openings in the blade and in the said support, a compression spring surrounding said bolt above said support, and a nut for adjusting the compression of said spring.

8. A multiple-mold shear device for glass-working machines, comprising an oscillable blade support having a depending flange at one side, a plurality of blades, each of which is secured yieldingly beneath the said support with the rear end of the blade engaging the said depending flange, bolts extending through registering openings in the said blade and in the said support, a spring surrounding each of said bolts above said support, and nuts for adjusting the compression of said springs.

Signed at Butler, Pennsylvania, this 16th day of March, 1925.

GEORGE E. HOWARD.